United States Patent
Meredith et al.

(10) Patent No.: US 7,992,478 B2
(45) Date of Patent: Aug. 9, 2011

(54) MITER ASSEMBLY FOR MITER SAWS

(75) Inventors: Daryl S. Meredith, York, PA (US);
Stephanie L. Vogel, York, PA (US);
Frederick R. Bean, Finksburg, MD (US); Brian P. Wattenbach, Menomonee Falls, WI (US); Adan Ayala, Baltimore, MD (US)

(73) Assignee: Black & Decker Inc., Newark, DE (US)

(*) Notice: Subject to any disclaimer, the term of this patent is extended or adjusted under 35 U.S.C. 154(b) by 0 days.

(21) Appl. No.: 12/606,366

(22) Filed: Oct. 27, 2009

(65) Prior Publication Data
US 2010/0043615 A1 Feb. 25, 2010

Related U.S. Application Data

(63) Continuation of application No. 12/574,866, filed on Oct. 7, 2009, which is a continuation of application No. 11/409,903, filed on Apr. 24, 2006, now abandoned.

(60) Provisional application No. 60/677,174, filed on May 3, 2005.

(51) Int. Cl.
*B62D 5/08* (2006.01)
*B27B 27/06* (2006.01)
*B23D 45/14* (2006.01)
*B23D 47/02* (2006.01)

(52) U.S. Cl. .................. 83/471.3; 83/490; 83/581
(58) Field of Classification Search .............. 83/490, 83/471.3, 477.1, 581, 486.1, 489, 472, 486, 83/498, 473, 477.2, 564, 486.3, 468.7, 698.51, 83/98, 371.3, 373, 477
See application file for complete search history.

(56) References Cited

U.S. PATENT DOCUMENTS

| | | | |
|---|---|---|---|
| 5,249,496 A * | 10/1993 | Hirsch et al. | 83/471.3 |
| 6,810,780 B2 * | 11/2004 | Ceroll et al. | 83/471.3 |
| 7,210,415 B2 * | 5/2007 | Brunson | 108/104 |
| 7,275,470 B2 * | 10/2007 | Bettacchini | 83/490 |
| 2005/0284276 A1 * | 12/2005 | Talesky et al. | 83/471.3 |

* cited by examiner

*Primary Examiner* — Ghassem Alie
(74) *Attorney, Agent, or Firm* — Adan Ayala

(57) ABSTRACT

A miter saw having a base assembly, a rotatable table rotatably disposed on the base assembly, and a saw assembly rotatably supported by the table. The miter saw also has a miter lock assembly for locking the rotational position of the saw of the table relative to the base assembly.

10 Claims, 3 Drawing Sheets

US 7,992,478 B2

MITER ASSEMBLY FOR MITER SAWS

CROSS-REFERENCE TO RELATED APPLICATIONS

This application is a continuation of U.S. application Ser. No. 12/574,866, filed on Oct. 7, 2009, which in turn is a continuation of U.S. application Ser. No. 11/409,903, filed on Apr. 24, 2006 now abandoned, which in turn derives priority from U.S. Application No. 60/677,174, filed May 3, 2005.

FIELD OF THE INVENTION

This invention relates generally to a miter assembly for a miter saw.

BACKGROUND

Typical miter saws have a base assembly, a table that is rotatable relative to the base assembly, and a saw assembly including a motor and a blade driven by the motor. The saw assembly may be pivotally attached to the table in order to allow for inclined cuts relative to the top surface of the table.

It is an object invention to provide a miter assembly for such miter saws.

SUMMARY

An improved miter saw is employed. The miter saw preferably has a base assembly, a rotatable table rotatably disposed on the base assembly, a saw assembly rotatably supported by the table, and a miter lock assembly for locking the rotational position of the saw of the table relative to the base assembly.

Additional features and benefits are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 5 illustrates a miter detent assembly, where

DETAILED DESCRIPTION

Figure 1:
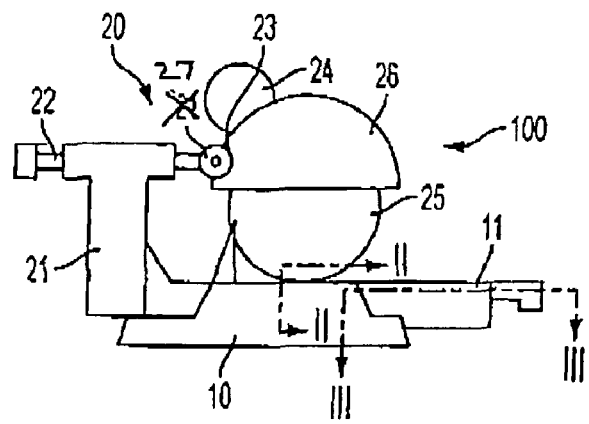
FIG. 1 is a side view of an exemplary miter saw according to the invention.

The invention is now described with reference to the accompanying figures, wherein like numerals designate like parts. Referring to FIG. 1, a miter saw 100 may include a base assembly 10, a table assembly 11 supported by base assembly 10, and a saw assembly 20 supported by the table assembly 11. Saw assembly 20 may include a support housing 21 rotatably connected to the table assembly 11, at least one rail 22 slidably connected to the support housing 21, a pivotable arm 23 pivotably attached to trunnion 27, a motor 24 supported by the arm 23 and driving a blade 25. Arm 23 may also support an upper blade guard 26, which preferably covers an upper part of blade 25. A lower blade guard (not shown) may be pivotally attached to upper blade guard 26 to cover a lower part of blade 25.

Persons skilled in the art will recognize that miter saw 100 as shown is a slide miter saw. However, miter saw 100 may be a non-sliding miter saw by changing the elements in saw assembly 20, as is well known in the art.

Figure 2:
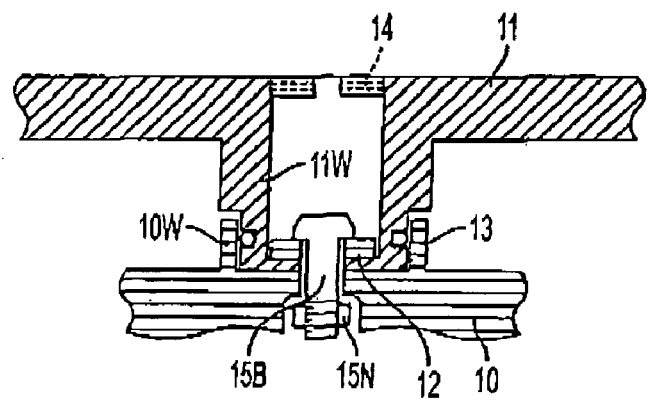
FIG. 2 is a cross-sectional side view along line II-II of FIG. 1.

Referring to FIG. 2, base assembly 10 may have wall(s) 10W receiving wall(s) 11W of table assembly 11. Preferably, wall(s) 10W is a single annular wall. Preferably, wall(s) 11W is a single annular wall. A washer or bearing surface 12 may be disposed between base and table assemblies 10, 11.

A bolt 15B may extend through base and table assemblies 10, 11 and threadingly engage a nut 15N, holding together base and table assemblies 10, 11.

In order to minimize play between base and table assemblies 10, 11, it is preferable to provide at least one O-ring 13 between walls 10W, 11W.

Table assembly 11 may carry a kerf plate 14 as is well known in the art.

Figure 3:
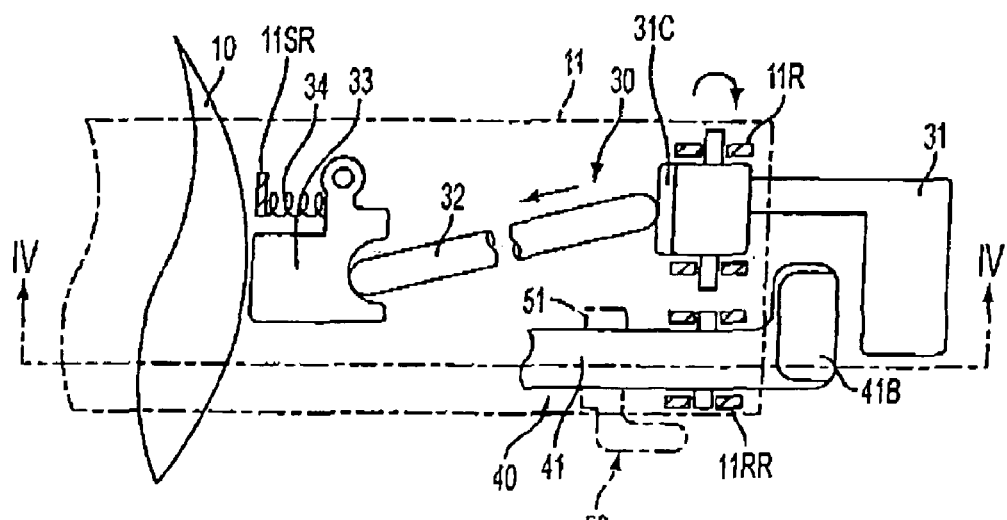
FIG. 3 is a partial cross-sectional view along line III-III of FIG. 1.

Referring to FIG. 3, a miter lock assembly 30 may be provided to lock the pivotal position of table assembly 11 relative to the base assembly 10. Miter lock assembly may include a handle 31. Handle 31 is preferably pivotally attached to ribs 11R of table assembly 11. The handle 31 preferably has a cam 31C attached thereto. When the handle 31 is pivoted downwardly, the cam 31C preferably pushes a rod 32 towards the base assembly 10.

A clamp block 33 may be pivotally attached to the table assembly 10. Rod 32 preferably contacts and pushes clamp block 33 towards the base assembly 10 when the handle 31 is rotated, thus locking the table relative the base assembly 10.

A spring 34 may be disposed between clamp block 33 and a rib 11SR of table assembly 11. Accordingly, when handle 31 is pivoted upwardly, pressure is taken off the rod 32 and thus the clamp block 33. Spring 34 preferably pushes the clamp block 33 away from the base assembly 10, thus allowing the table assembly 11 to move relative to the base assembly 10.

Figure 4:
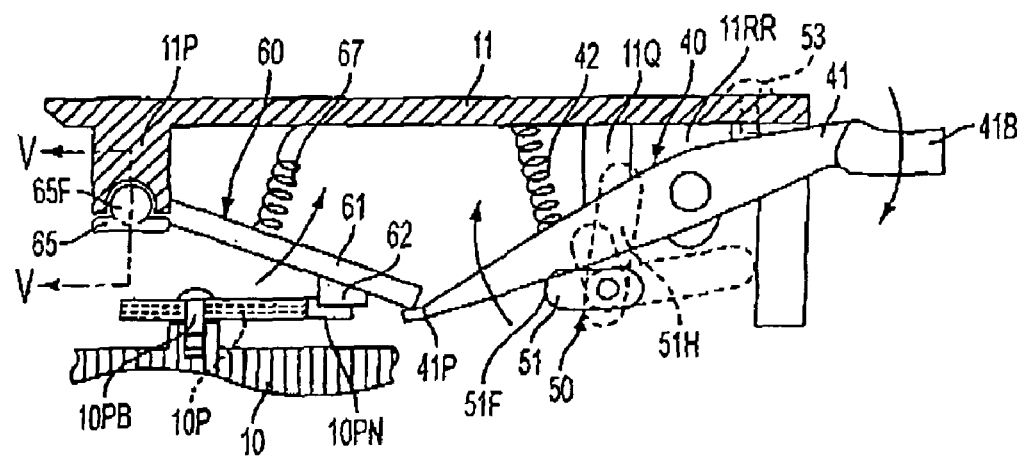
FIG. 4 is a partial cross-sectional view along line IV-IV of FIG. 3.
Figure 5A:
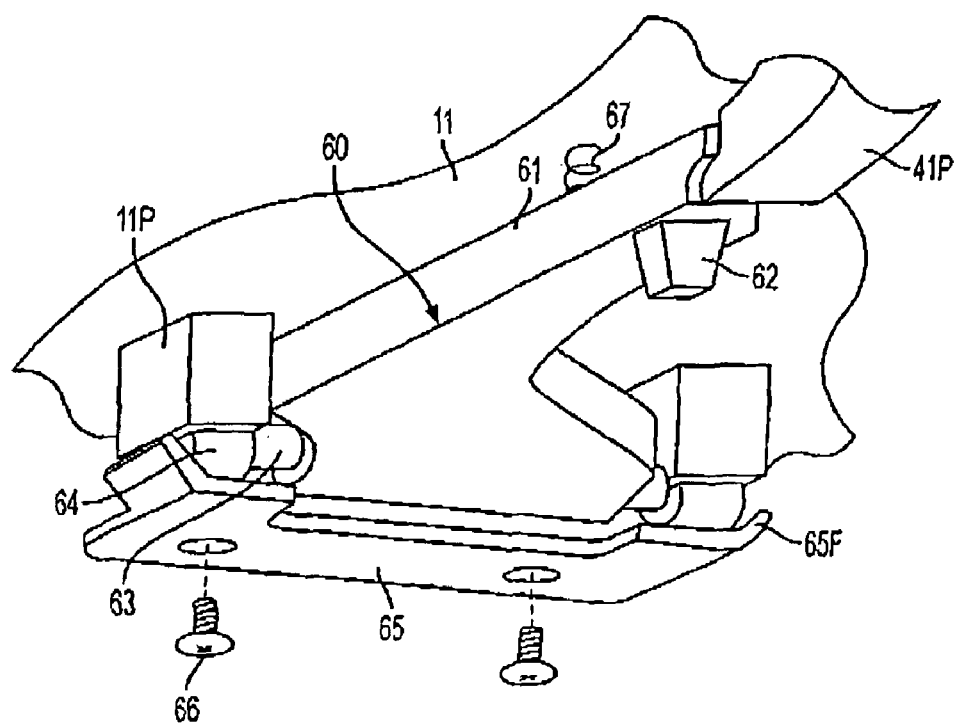
FIGS. 5A-5B are a perspective view and a partial cross-sectional view along line V-V of FIG. 4, respectively.
Figure 5B:
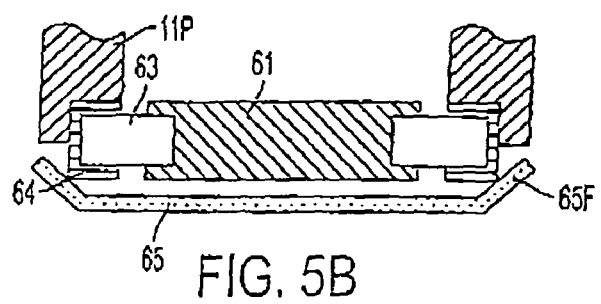

Referring to FIGS. 3-5, the base assembly 10 preferably has a detent plate 10P attached thereto with notches 10PN. Detent plate 10P may be attached to base assembly 10 via a bolt 10PB extending through detent plate 10P and threadingly engaged to base assembly 10.

A miter detent assembly 60 may be pivotably attached to table assembly 11. Miter detent assembly 60 preferably includes a body 61, with a detent portion 62 that engages a notch 10PN in detent plate 10P.

Body 61 may have at least one axle 63. Bearings 64 (such as ball or needle bearings) are preferably press fit on the axle(s) of body 61. The bearings 64 are preferably trapped between posts 11P of table assembly 11 and a clamp plate 65. Clamp plate 65 is preferably made of spring steel and may have two angled flanges 65F. Clamp plate 65 may be attached to table assembly 11 via bolts 66 extending through clamp plate 65 and threadingly engaging table assembly 11.

Persons skilled in the art will recognize that angled flanges 65F will preferably force bearings 64 towards each other and down into posts 11P when bolts 66 are rotated.

Preferably, miter saw 100 has a detent override assembly 40 to move detent portion 62 from a first position engaging notch 10PN (where the table assembly 11 cannot be rotated relative to base assembly 10) and a second position not engaging notch 10PN (allowing table assembly 11 to rotate relative to base assembly 10). Persons skilled in the art are referred to the detent override assembly described in U.S. Pat. No. 6,810, 780, which is fully incorporated herein by reference, as an example of detent override assembly 40.

Detent override assembly 40 may include a body 41, which may be pivotally attached to ribs 11RR of table assembly 11. Body 41 preferably has a button 41B extending beyond table assembly 11 for the user to actuate detent override assembly 40.

Body 41 has a portion 41P that can contact body 61 to move detent 62 between the first and second positions. With such arrangement, when the user presses button 41B downwardly, portion 41P lifts body 61, thus moving detent 62 to the second position.

A spring 67 is preferably disposed between table assembly 11 and body 61 to bias the detent 62 to the first position. Accordingly, when the user releases button 41B, spring 67 preferably moves body 61 downwardly, thus moving detent to the first position.

A spring 42 may be disposed between the table assembly 11 and the body 41 to bias portion 41P away from body 61. Such bias in effects biases button 41B upwardly.

It may be preferable to provide a detent bypass assembly 50. Referring to FIGS. 3-4, detent bypass assembly 50 may include a cam 51, which may be pivotally attached to ribs 11Q of table assembly 11. Cam 51 preferably has a handle 51H extending beyond table assembly 11 for the user to rotate cam 51.

With such arrangement, the user can rotate handle 51H, causing cam 51 to rotate. Such rotation causes body 41 to rotate (thus moving detent 62 to the second position). Preferably cam 51 has a flat portion 51F that maintains body 41 in the rotated position (and thus maintaining detent 62 in the second position), allowing the user to rotate table assembly 11 without any engagement between detent 62 and detent plate 10P.

Cam 51 is preferably disposed underneath body 41 between ribs 11RR and portion 41P. However, persons skilled in the art will recognize that cam 51 can be disposed above body 41 and between ribs 11R and button 41B and still move and maintain detent 62 in the second position.

Persons skilled in the art shall recognize that, when the user rotates cam 51 to its original position, spring(s) 42 and/or 67 will cause detent 62 to move back to its first position and/or body 41 to move back to its original position.

Persons skilled in the art will also recognize that cam 51 may be replaced by a screw 53 threadingly engaged to table assembly 11 for rotating body 41 and moving detent 62 to the second position. Screw 53 is preferably disposed above body 41 and between ribs 11R and button 41B. However, persons skilled in the art will recognize that screw 53 can be disposed underneath body 41 between ribs 11RR and portion 41P and still move and maintain detent 62 in the second position.

Persons skilled in the art may recognize other additions or alternatives to the means disclosed herein. However, all these additions and/or alterations are considered to be equivalents of the present invention.

What is claimed is:

1. A miter saw comprising:
a base assembly,
a rotatable table rotatably disposed on the base assembly;
a saw assembly rotatably supported by the table;
a miter detent assembly for fixing the rotational position of the saw of the table relative to the base assembly, the miter detent assembly comprising a detent plate attached to the base assembly having at least one detent notch, a detent body pivotably attached to the table and being movable between a first position engaging the at least one detent notch and a second position not engaging the at least one detent notch;
a handle for moving the detent body from the first position towards the second position; and
a detent bypass assembly disposed on the table for moving and maintaining the handle and the detent body in the second position,
wherein the detent bypass assembly comprises a cam surface disposed adjacent to the handle the cam surface being movable between a neutral position and a displaced position which moves the handle and the detent body towards the second position.

2. The miter saw of claim 1, wherein the detent body has at least one axle.

3. The miter saw of claim 2, wherein the at least one axle is disposed within at least one bearing.

4. The miter saw of claim 3, wherein the at least one bearing is trapped between the table and a plate.

5. The miter saw of claim 1, wherein the miter detent assembly further comprises a spring disposed between the table and the detent body for biasing the detent body towards the first position.

6. The miter saw of claim 1, wherein the handle is pivotably attached to the table.

7. The miter saw of claim 6, wherein the handle contacts the detent body.

8. The miter saw of claim 1, wherein the cam surface is rotated between the neutral and displaced positions.

9. The miter saw of claim 1, wherein the cam surface is linearly moved between the neutral and displaced positions.

10. The miter saw of claim 6, wherein the detent bypass assembly comprises a screw threadingly engaged to the table and disposed adjacent to the handle, the screw being movable between a neutral position and a displaced position which moves the handle and the detent body towards the second position.

* * * * *